United States Patent

Zimmerman et al.

[15] 3,640,195
[45] Feb. 8, 1972

[54] CARDBOARD CAMERA AND KIT THEREFOR

[72] Inventors: Burton R. Zimmerman, Medina; Roger W. Bodley, Chesterland; Robert C. Goodman, Shaker Heights, all of Ohio

[73] Assignee: Educational Research Council of America, Cleveland, Ohio

[22] Filed: Apr. 23, 1969

[21] Appl. No.: 818,748

[52] U.S. Cl. .........................................................95/11 R
[51] Int. Cl. .......................................................G03b 19/02
[58] Field of Search......................................................95/11

[56] References Cited

UNITED STATES PATENTS

| | | | |
|---|---|---|---|
| 622,315 | 4/1899 | Wreede | 95/11 |
| 1,222,310 | 4/1917 | Lichtman | 95/11 |
| 1,479,112 | 1/1924 | Sparks | 95/11 |
| 2,390,932 | 12/1945 | Fitz | 95/11 |
| 2,751,825 | 6/1956 | Fried | 95/11 |
| 3,260,152 | 7/1966 | Aston | 95/11 X |

*Primary Examiner*—John M. Horan
*Assistant Examiner*—Kenneth C. Hutchison
*Attorney*—Meyer, Tilberry and Body

[57] ABSTRACT

A camera which is suitable for student scientific work wherein the camera is constructed from a kit made up primarily of a plurality of cardboard pieces obtained from a die-cut sheet of cardboard. Two of the pieces form boxes which telescope one into the other to form the camera enclosure, one of the boxes defining the front side of the camera and the camera aperture, the other box defining the rear side of the camera and a rectangular enlarged opening therein.

The rear side supports a frame adapted to support in turn a commercial cut-film holder, the two boxes being telescopically movable to position a film in the holder at the focal length of the camera aperture. The cardboard sheet also provides a diaphragm in tab form having a plurality of openings of different diameters positioned lengthwise on the tab, a shutter also in tab form with an opening, and a plurality of strips which can be glued to the front side of the camera to guide the diaphragm and shutter in separate planes across the front of the camera enclosure, with the openings of the shutter and diaphragm alignable with the aperture of the camera. The shutter is actuatable by a rubberband affixed to the camera enclosure, the kit also including cardboard pieces adapted to form a viewing screen holder which can be placed against the rear side of the camera enclosure in place of the commercial cut-film holder.

7 Claims, 7 Drawing Figures

PATENTED FEB 8 1972 3,640,195

INVENTORS.
BURTON R. ZIMMERMAN,
ROGER W. BODLEY &
ROBERT C. GOODMAN

BY Meyer, Tilberry & Body
ATTORNEYS

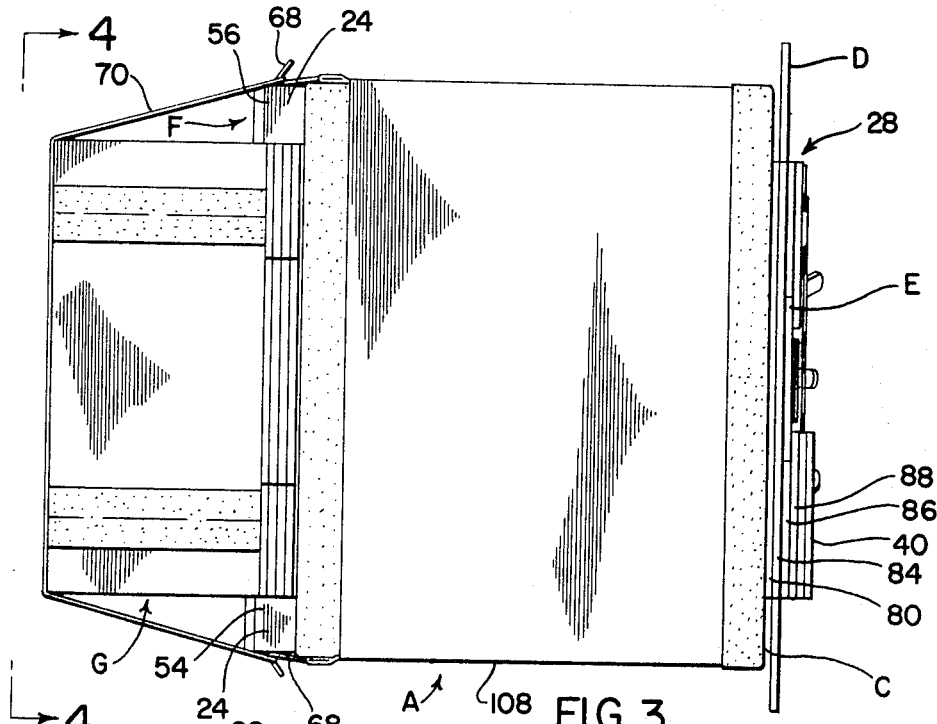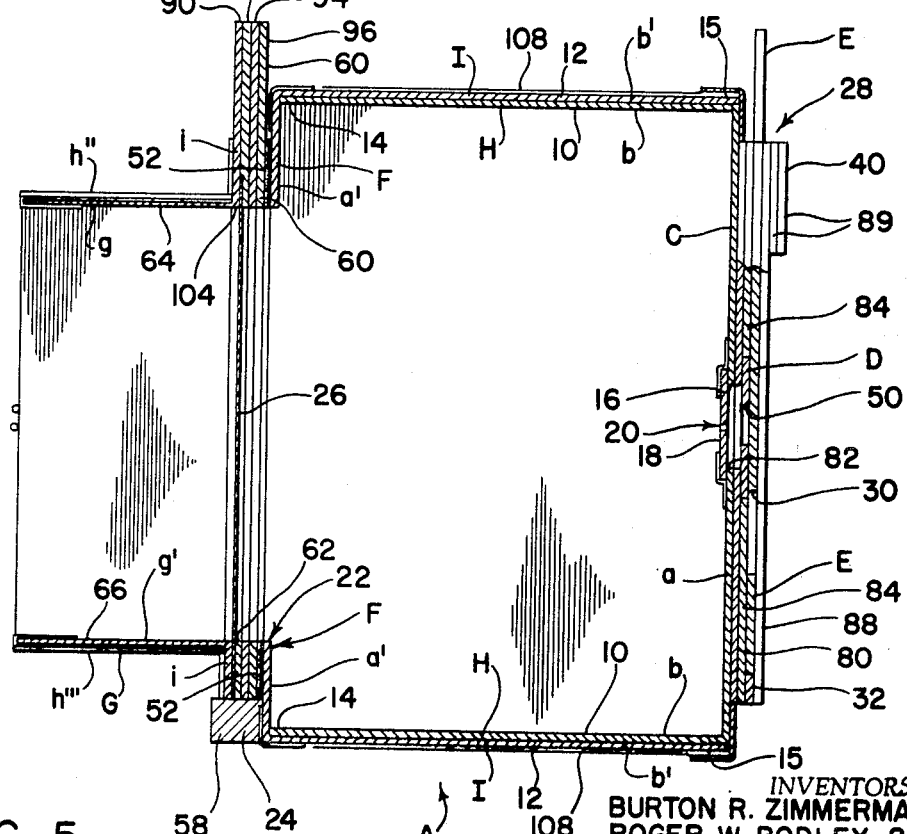

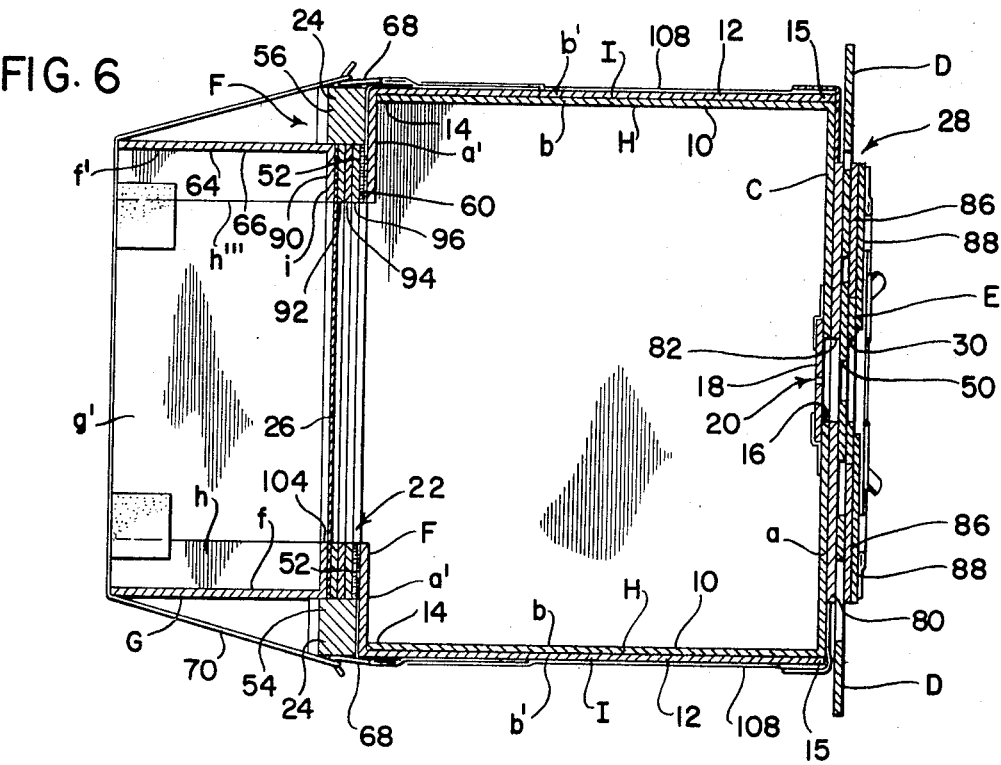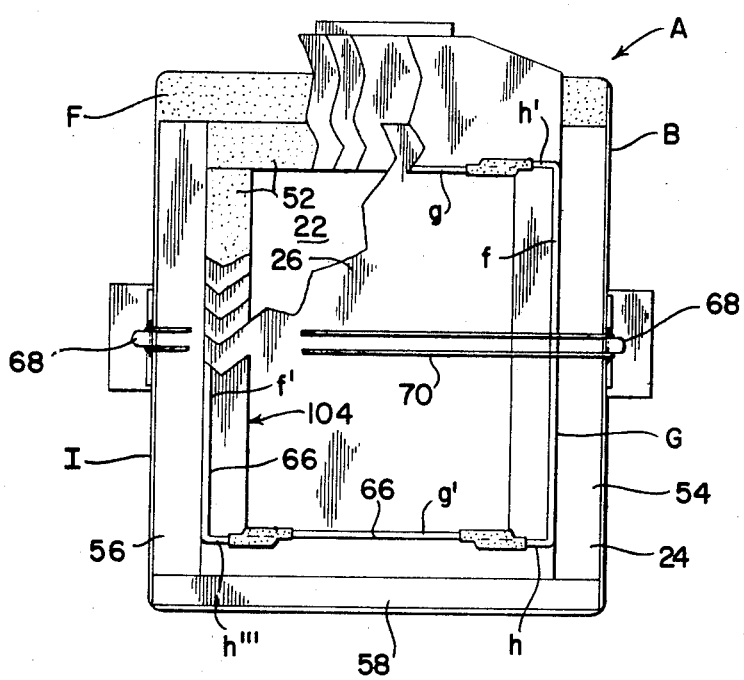

CARDBOARD CAMERA AND KIT THEREFOR

DESCRIPTION

The present invention pertains to the art of photographic cameras, and more particularly to a novel camera construction.

The invention is particularly applicable to a camera which can be constructed from a kit, and which at the same time is suitable for scientific work by students, and will be described with particular reference thereto, although it will be appreciated that the invention has broader application.

In student scientific work, there is a considerable need for a good inexpensive camera. There are available very inexpensive cameras which can be purchased for less than 1 dollar. These cameras have a lens to gather and focus light rays, a shutter to time the exposure, and a means for holding film, but they suffer from a number of disadvantages, particularly if it is desired to use them in scientific work. For one, the inexpensive cameras provide a viewfinder which is separate from the camera lens system, for lining up the picture. In scientific work, there is a need to see the exact image which will be recorded on the camera film, and the small image seen in a viewfinder of an inexpensive camera prevents observation on the position, size, sharpness of the image, or amount of light coming through the lens.

As another disadvantage, the inexpensive cameras can be used only with a roll of film, and all 12 pictures of the roll obviously should be exposed before the film is developed. In laboratory work, there is often a need to take one or two pictures and note the results, before further pictures are taken.

Also, the inexpensive cameras have only a fixed shutter speed, for instance, about one-fiftieth of a second. In a dimly lit room, perhaps there will be a need for an exposure of 1 or 2 seconds. In this respect, the inexpensive cameras have no adjustable diaphragm by which variable amounts of light can be admitted to the camera.

And of course, a purchased already constructed camera, whether inexpensive or not, provides the student with no knowledge of the principles and construction of a camera, or theories of photography and how they can be applied to scientific work.

The present invention contemplates a novel and improved camera and method of construction which overcomes the above referred to problems and others, and in particular, a camera which can be simply and easily constructed from a kit utilizing inexpensive materials, and which satisfies the criteria of student scientific work.

More particularly there is provided in accordance with the present invention a kit comprising a plurality of flat pieces of material from which the principle components of a camera are formed, two of said pieces being formable into boxes which telescope one into the other to form the camera enclosure, one of the boxes defining the camera front side and an aperture therein, the other box defining the camera rear side and an enlarged rectangular opening therein. The rear side of the enclosure is adapted to support a cut-film holder, the two boxes being telescopically movable so that a film holder is positionable at the focal length of the camera aperture. Additional pieces of the kit provide a shutter in tab form including an opening, a diaphragm also in tab form including a plurality of aligned openings of different diameters, and guide strips fastenable to the enclosure front side by which the diaphragm and shutter are movable in separate planes across the enclosure front side with the openings thereof alignable with the camera aperture.

Preferably, the kit comprises a flat die-cut sheet of cardboard from which said pieces are obtained.

In accordance with an aspect of the invention, the sheet of cardboard is darkened on one side, so that surfaces of the camera to which a film is exposed are darkened.

In accordance with a further aspect of the present invention, the camera enclosure rear opening has substantially the dimensions of commercial cut film, the kit including means to line said opening around its edge with a rearwardly facing gasket surface adapted to provide a light tight fit with a cut-film holder, the kit also including pieces to form a viewing screen holder positionable against the gasket surface having some of the same dimensions of a commercial cut-film holder.

Accordingly, it is an object of the present invention to provide a kit from which a camera can be constructed, and in particular, a kit of inexpensive cardboard, wood, metal and rubber parts from which a camera suitable for scientific work can be constructed.

The invention, other objects and advantages thereof will become apparent upon consideration of the following specification, with reference to the accompanying drawings, in which FIG. 1 is a perspective front view of a camera in accordance with the invention;

FIG. 3 is a section view taken along line 3—3 of FIG. 2;

FIG. 4 is a rear partially broken-away view taken along line 4—4 of FIG. 3;

FIG. 5 is a section view taken along line 5—5 of FIG. 2;

FIG. 6 is a section view taken along line 6—6 of FIG. 2; and

Figure 1:
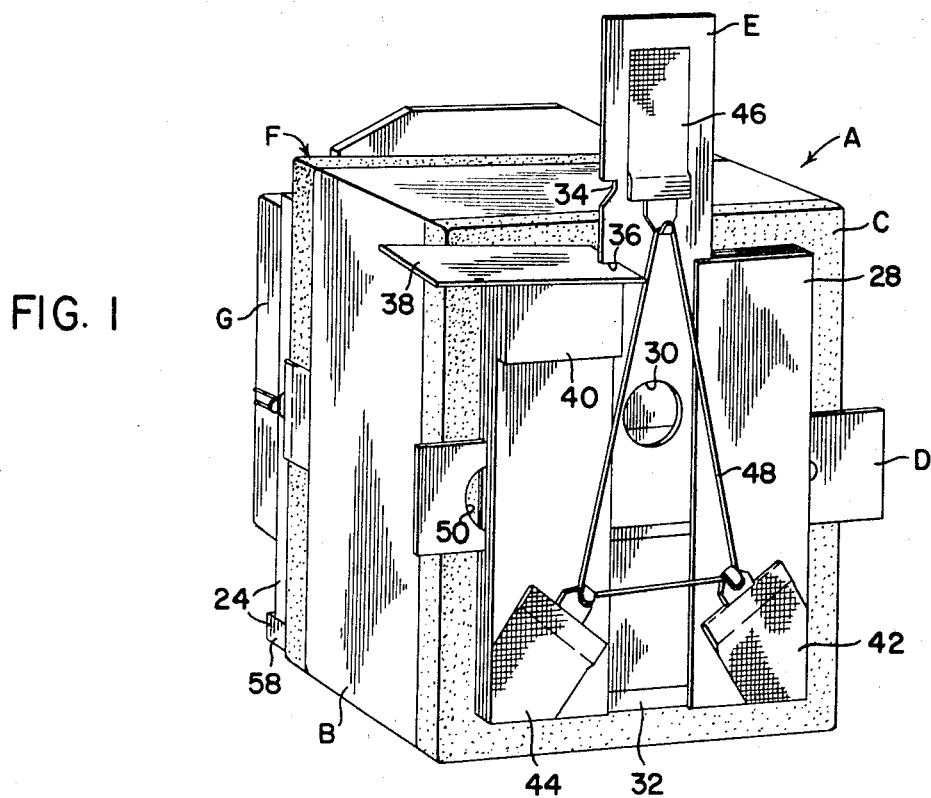

Referring now to the drawings wherein the showings are for the purpose of illustrating the preferred embodiment of the invention only and not for purpose of limiting the same, the Figures show a camera A which includes an enclosure B having a front side C, the camera including a diaphragm D and shutter E movable across the front side. Spaced from the front side C is a rear side F (best shown in FIG. 4) to which is attached viewing screen holder G (or commercial cut-film holder not shown), the enclosure B comprising front and rear boxes H and I (Fig. 5) which are telescopically movable one within the other.

The camera enclosure or box is substantially cubical in shape, as shown in FIG. 1, slightly larger in dimension than a conventional box camera. With reference to FIGS. 5 and 6, it is made up of the two boxes H and I, the front box H being so termed as the front wall C is part of this box, and the rear box I being so termed as the rear wall or side F is part of this box. In addition to the front wall C, the front box H includes inner sidewalls 10 (on all four sides), and in addition to the rear wall F, the rear box I includes outer sidewalls 12 (on all four sides). Both boxes are open at the ends thereof removed from the sides C and F, the front box H fitting closely open end first into the rear box I in a telescoping manner so that the side walls 10 and 12 of the two boxes overlap. When the two boxes are completely pushed together, the front and rear sides C and F are spaced apart as shown in FIGS. 5 and 6, a distance equal to the longitudinal dimension of the sides 10 and 12. Notice that the free edges 14 of the inner walls 10 of front box H terminate and fit up against the rear side F (in FIGS. 5 and 6), and that the free edges 15 of the outer walls 12 of the rear box I are substantially coplanar with the front side C.

On the front side of the camera enclosure, defined by the front box H, there is provided a centered opening 16 on the inside of which is taped a member 18 (FIGS. 5 and 6) defining a pinhole or lens opening 20, hereinafter referred to broadly as the camera aperture. The rear side F (FIG. 4) defines a much larger rectangular opening 22, about which is positioned a frame broadly indicated as item 24 (to be described later in more detail) adapted to support a commercial cut-film holder (not shown) or the viewing screen holder G, either one being removable and replaceable with the other. Within or supported by the viewing screen holder, is a large rectangular viewing screen 26 approximately coextensive with the opening 22 (notice FIGS. 5 and 6). It is to be understood that the viewing screen 26 is positioned substantially as a piece of commercial cut film would be by its holder, or vice versa, and that the showing of FIGS. 5 and 6 is representative of either a viewing screen or commercial cut film.

It is well known that if an aperture is in the form of a pinhole, sharp images will be formed of objects at various distances from the aperture; whereas, if the aperture is in the form of a lens, the focal length depends upon the thickness and curvature of the lens. It is an important feature of the present invention that the aperture 20 can be made by a lens having one focal length, and that the lens can quickly and easily be replaced with one having a different focal length, or replaced even with the pinhole aperture, to suit the needs of the particular experiment involved.

Accordingly, it is a further important feature of the present invention that the two boxes H and I are telescopically movable i.e., that the rear box I is slidable rearwardly over the front box H. In this way, the front and rear walls C and F of the boxes are positionable a variable distance apart; and the film of a cut-film holder, or the viewing screen (item 24 of FIG. 5 of the viewing screen holder) thereby is positionable to form images with a wide variety of camera apertures.

The camera includes, on the front side C of the enclosure (FIGS. 1 and 2) a shutter assembly (generally indicated with the number 28) which guides the shutter E and diaphragm D so that they are movable in separate planes across the front side. Details of the shutter assembly will be described, but it is sufficient at this time to indicate that the diaphragm D is movable in a substantially horizontal direction in an inner plane (relative the front side of the camera enclosure), and the shutter E is movable in a substantially vertical direction in a plane further spaced from the front side.

The shutter E is an elongated rectangular member in tab form having, about two-thirds of the distance from its top, an opening 30 centered between the longer sides of the shutter. The shutter is movable across the front side C so that this opening is alignable with the camera aperture 20, and when so aligned, permits light to enter through the aperture to the inside of the camera enclosure.

Figure 2:
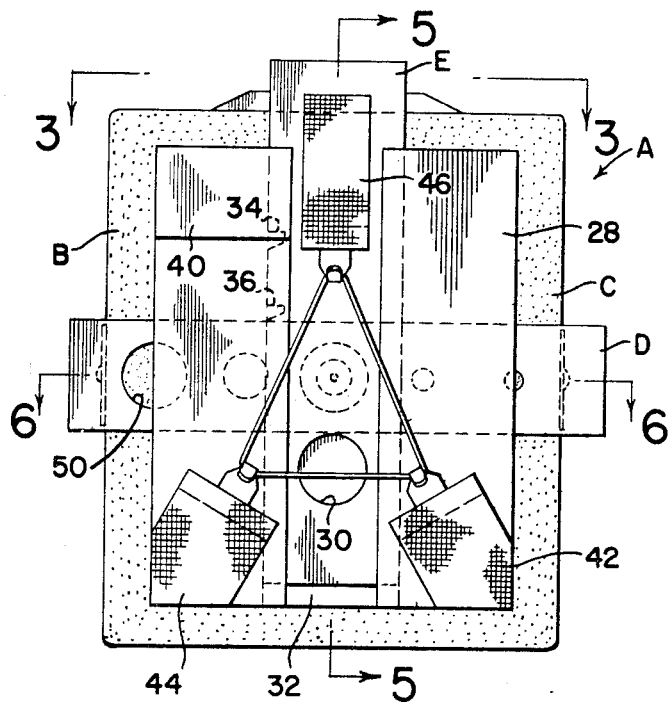
FIG. 2 is a front view of the camera of FIG. 1.

FIG. 1 shows the shutter E in an elevated position, and FIG. 2 in a lower position, in the latter position against a guide stop 32. In the elevated position (FIG. 1), the opening 30 of the shutter is above the aperture 20, whereas in the lower position, FIG. 2, the shutter opening is below the camera aperture. In neither position is light admitted to the enclosure.

Referring again to FIG. 1, the left-hand side of the shutter is provided with two spaced notches, upper notch 34 and lower notch 36. Also shown in this Figure is a trigger 38 in the form of a flat rectangular member; and a built-up surface 40 extending outwardly from the front side C of the camera, hereinafter referred to as a trigger holder. The latter is built-up sufficiently away from the side C to support or provide a seat for the trigger 38, permitting the trigger to engage one of the two notches 34, 36. This holds the shutter E in one of two elevated positions away from stop 32.

FIGS. 1 and 2 also show a plurality of tab hooks 42–46 (three in all), the two lower tab hooks 42 and 44 being fastened to the front of the shutter assembly 30 at the bottom corners thereof, the upper tab hook 46 being fastened to the top of the shutter itself. The three tab hooks inscribe a triangular configuration, and are all engaged by a rubberband 48 extending between the hooks, having a length such that it is stretched taut when the shutter is in an elevated position. If the lower notch 36 of the shutter is engaged by the trigger 38, the opening 30 of the shutter is above aperture 20, (in the elevated position mentioned above where no light is admitted to the camera enclosure), and when the trigger 38 is removed, the shutter snaps downwardly under the force of the rubberband against the guide stop 32, admitting light into the enclosure only as it passes aperture 20.

As a still further feature of the present invention, by using stronger or weaker rubberbands, a broad range of exposure times are available.

If the trigger 38 is used to engage the upper notch 34, the shutter simply is held so that its opening 30 is in alignment with the camera aperture, the rubberband pulling against the trigger to hold the shutter stationary, and light is admitted into the camera enclosure as long as the shutter remains in this position.

This upper notch is used in conjunction with the viewing screen holder G in a manner to be described; and in addition permits longer exposure times (longer than a second more or less), to be obtained. If desired, of course 1 or 2 minute exposure times can also be obtained simply by removing the rubberband and operating the shutter by hand.

The diaphragm D is an elongated tab similar in shape to the shutter E, having about the same dimensions, and is provided with a plurality of longitudinally aligned openings 50 (FIG. 2) centered between the parallel longer sides of the diaphragm. The diaphragm is movable across the front side of the camera so that these openings also align with the camera aperture, the openings being differently sized (varying in this example from about $f/7.2$ to $f/31$) providing a means for introducing variable amounts of light into the camera. In this respect, the shutter opening 30 is equal in diameter with the largest diaphragm opening ($f/7.2$). The diaphragm is used only if a lens is employed with the camera enclosure as the camera aperture 20, and is not employed with a pinhole aperture.

Further details of the rear side F of the camera enclosure can be had with reference to FIG. 4. The enlarged opening 22 is dimensioned so that it is about the same size as a piece of commercial cut film. Extending around or lining the opening is a surface 52 of black feltlike or other material providing a gasket surface to establish a lighttight seal with a cut-film holder (not shown) or the viewing screen holder G placed against the surface. The surface in turn is partially encompassed by the frame 24 comprising outwardly extending frame members 54 and 56 on the sides thereof and a frame member 58 along the bottom, all of which serve to position the film holder or viewing screen holder. These frame members are strips of wood glued to the rear side of the camera, their purpose being to position the holder so that the edges of a piece of film therein (or the viewing screen) will be coextensive with the edges of opening 22. In this respect, the two strips 54 and 56 are about four inches apart. Obviously strips of material other than wood can be used for the frame.

Also shown in this Figure and in FIGS. 3, 5 and 6, is the viewing screen holder G. With reference to FIG. 6, this holder comprises a front wall 60 adapted to be held against the gasket surface 52, this wall defining an opening 62 dimensioned the same as rear opening 22 of the camera enclosure. Held in the wall 60 (in a manner to be described) is a sheet of tracing paper extending across the opening 62 constituting the viewing screen 26, the holder also having a rearwardly extending enclosure 64 having upper, lower and sidewalls 66 into which the operator of the camera peers.

To hold the viewing screen onto the camera rear side, positioned by the frame 24 (and also to hold a film holder on to the camera), the camera is provided with tab hooks 68 (FIGS. 4 and 6) on the sidewalls thereof, about half way between the bottom and top sides, and a rubberband 70, extends between the tab hooks across the viewing screen or film holder to hold these members in place.

It is a feature of the present invention that the main components of the camera are constructed from a flat sheet of cardboard. Such a sheet is shown on FIG. 7, and although the camera can be constructed from a sheet of material other than cardboard, such as metal, the use of cardboard has a number of advantages. One advantage is that it is inexpensive. Also, it can be die cut and creased in advance, permitting the component parts to be punched easily from the cardboard sheet by a student and folded where necessary into the desired shapes.

Also cardboard is easy to work with in that surfaces of the cardboard can readily be glued or taped together. Further, cardboard is relatively durable.

Figure 7:
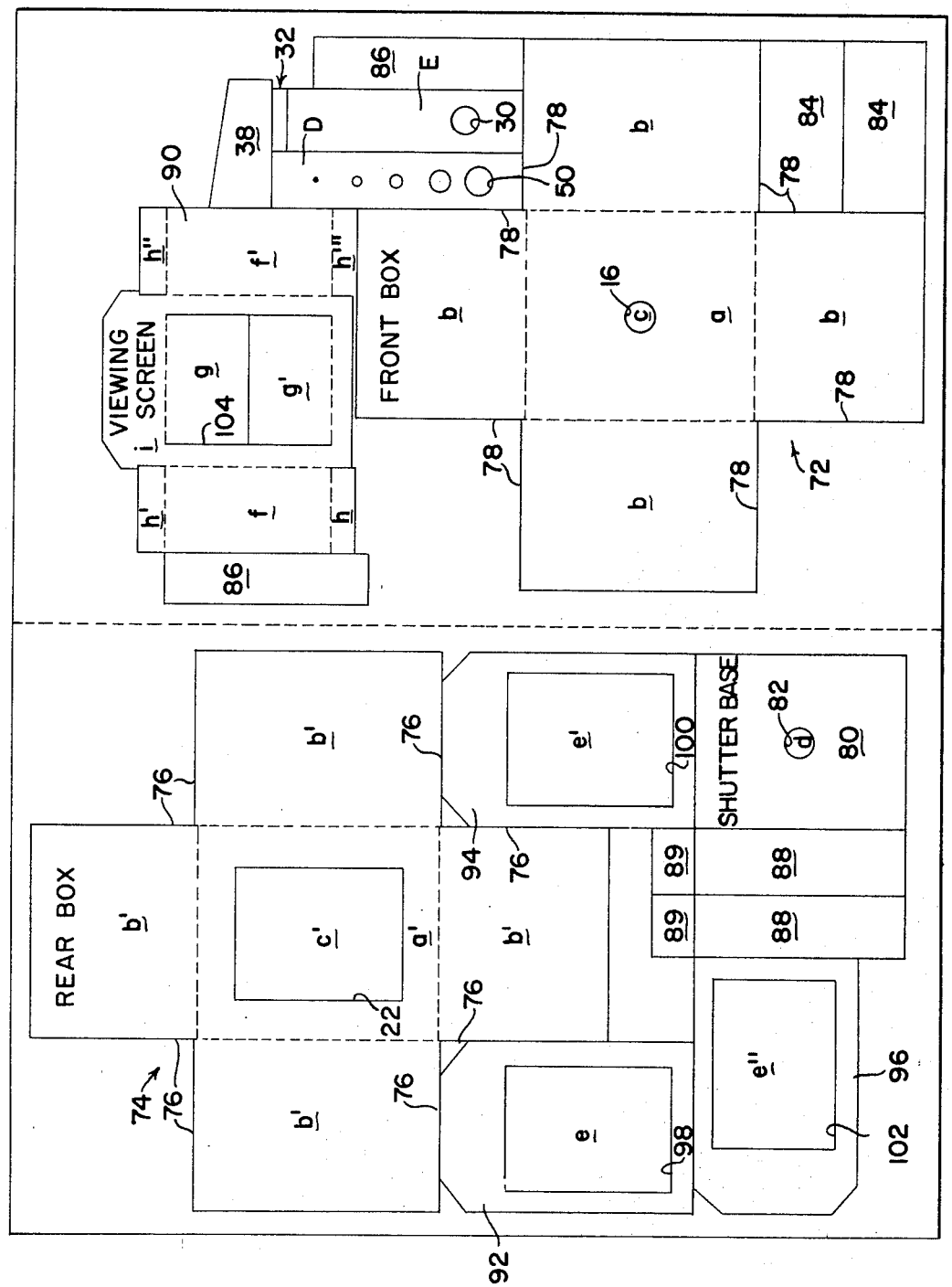
FIG. 7 is a plan view of a sheet of cardboard from which the camera is constructed in accordance with the present invention.

Referring to the drawing, FIG. 7 the solid lines represent those lines which have been die cut, for severing parts from the sheet, whereas the dashed lines represent lines which have simply been creased to permit folding surfaces of the cardboard. Preferably, the side of the cardboard sheet not shown is blackened, so that the camera following construction is, in a manner to become apparent, dark on the inside.

To form the enclosure of the camera there are two main pieces 72 and 74, labeled "Front Box" and "Rear Box," each of these pieces having a substantially square center panel ($a$ and $a'$, respectively) and four side flaps ($b$ and $b'$, respectively.)

After the rear box 74 is punched from the cardboard sheet, the four side flaps ($b'$) are folded down until the edges 76 are contiguous and the black or darkened sides are inwardly facing. The edges then are joined together using photographic tape to form the cubical member I closed at one end by panel ($a'$), and open at the opposite end, the photographic tape sealing the rear box so that no light leaks into it through the edges.

After the front box 72 is punched from the cardboard sheet, its four side flaps ($b$) also are folded down, again with the black or darkened sides on the inside, and the edges 78 thereof also are carefully taped together using photographic tape. Formed is the cubical member H defined at one end by the panel ($a$), and open at the opposite end.

The dimensions of the front and rear boxes are such that the front box slides or telescopically fits within the rear box, the open end first; so that when assembled together, as shown in FIGS. 5 and 6, the panel ($a'$) of the rear box constitutes the rear side F of the enclosure and the panel ($a$) of the front box constitutes the front side C of the enclosure. Also shown in FIGS. 5 and 6 are the adjacent flaps ($b$) and ($b'$) of the front and rear boxes constituting the side, bottom and top walls (10 and 12) of the boxes.

By punching a rectangular piece ($c'$) FIG. 7 from the rear box panel ($a'$), the rear opening 22 of the camera enclosure is formed. Similarly, by punching a circular piece ($c$) from the center of the front box panel ($a$), the opening 16 is formed.

FIG. 7 also shows the shutter tab (item E) and diaphragm (item D) which can be punched from the cardboard sheet, the openings 30 and 50 of these two items being formed simply by punching out and discarding the pieces within the openings.

To construct the shutter assembly, (item 28 of FIG. 1), there is provided on the cardboard sheet, FIG. 7, a rectangular basepiece 80 labeled "Shutter Base," from the middle of which a circular piece ($d$) is punched and discarded to define an opening 82. Also provided are two diaphragm guide strips 84; two shutter guide strips 86; and two shutter holder strips 88. With the shutter basepiece 80 light side up and dark side down, the diaphragm D is positioned horizontally across its face parallel with the shorter sides thereof, with the largest opening of the diaphragm aligned with the opening 82, and the diaphragm guide strips 84 are glued to the shutter base alongside the diaphragm fitting snugly with the diaphragm, but not too snug to prevent the diaphragm from sliding between the guide strips. The shutter E then is positioned across the top of the above parts, parallel to the longer sides of the shutter base and at right angles to the diaphragm, with the opening 30 aligned with the opening 82 of the basepiece, and the shutter guide strips 86 are then glued into place along its opposite sides. Following this, the two shutter holders strips 88 are glued over the shutter guide strips, outer edges aligned, the holder strips being of greater width than the guide strips so that they overlap onto the shutter. In this way they hold the shutter in place between the guide strips therefor.

Also part of the shutter assembly are two small trigger holder strips 89 which are glued at the top of the left-hand shutter holder strip 88 to define the built-up surface 40 (FIG. 1); the guide stop 32 glued at the bottom of the shutter channel; and the trigger 38.

The assembly of component parts is best seen in FIGS. 5 and 6, wherein the shutter assembly basepiece 80 is glued against the front side of panel ($a$) of the enclosure with openings aligned, the shutter E and diaphragm D being guided in separate planes by the shutter guide strips 86 (overlapped by holder strips 88) and the diaphragm guide strips 84, respectively.

Also, as shown in these Figures, a layer 108 of black vinyl or other plastic material is folded around the four sides of the enclosure covering the outer surface of the rear box. This layer is taped to the front box front side C so that the rear box is freely slidable in the space between the front box walls 10 and the layer, the latter providing a means for preventing light from entering the enclosure between the walls of the two boxes.

As mentioned above, the rear side F of the camera enclosure comprises panel ($a'$) of the rear box defining opening 22. Referring to FIGS. 4, 3, 5 and 6, the rear side is completed by fastening the wood strips 54–58 around the side and bottom edges of the panel ($a'$) to form the frame 24 for the viewing screen holder G (or a cut-film holder); and lining the opening 22 with strips of feltlike material glued to the panel ($a'$) to form the gasket lighttight surface 52, the strips fitting well at the corners so that there are no light leaks.

The viewing screen also is constructed primarily from the cardboard sheet of FIG. 7 utilizing cutout parts 90–96, the parts numbered 92, 94 and 96 having rectangular center pieces ($e$, $e'$ and $e''$) which can be removed and discarded to define openings 98, 100 and 102. The openings are all the same size, as are these pieces, and they are simply glued together to form one solid piece. Following this a piece of tracing paper is cut large enough to cover the now single opening defined by the three pieces, which tracing paper is glued to one of the pieces across the opening. Subsequently, the part 90 is removed from the sheet of cardboard, and is folded along the dashed lines as shown, with the side tabs ($f$ and $f'$) facing rearwardly dark side in, and the center tabs ($g$ and $g'$) also facing rearwardly dark side in. The four tabs are folded so that their corners are contiguous, the tabs ($f$ and $f'$) having upper and lower portions ($h$, $h'$, $h''$ and $h'''$) which are folded to overlap the surfaces of tabs ($g$ and $g'$). The tabs of the part 90 are then glued and taped together to define a cubical box, enclosed at one end by the center panel ($i$) of the part 90. When the tabs ($g$ and $g'$) of part 90 were folded rearwardly, opening 104 was formed in the panel ($i$) equal in dimension to openings 98–102. To complete the viewing screen holder the formed box (from part 90) is glued to the three parts 92, 94 and 96 with the tracing paper sandwiched between the panel ($i$) and the part on which it was glued, with the opening 104 aligned with the openings of the three parts.

As a feature of the invention, the use of three layers of cardboard between the viewing screen 26 and the rear side of the camera against which the holder is place substantially duplicates the thickness of a film holder and the positioning of a piece of film. In this way, with a particular focal length (i.e., a particular shaped lens), the camera enclosure is extended or contracted by telescopingly moving the front and rear boxes focusing the image exactly on the viewing screen, thereby insuring that the image subsequently recorded on a piece of camera film will be exactly in focus.

In this respect, during use of the viewing screen, the shutter E is held in its partially elevated position with the opening 30 aligned with the camera aperture. This is accomplished by positioning the trigger 38 (FIG. 1) in the notch 34 of the shutter, and holding the shutter stationary with rubberband 48. Also, during use of the viewing screen, the diaphragm is moved back and forth to obtain the desired amount of light needed for the ultimate exposure.

As the present invention is designed primarily for classroom use, it is contemplated that the instructor in the classroom will have on hand film and film holders; and also a variety of differently shaped lenses which will enable the students to experiment with different exposures for optimum results.

Accordingly, to use the camera, a student selects a desired lens or the pinhole to form the camera aperture, and then fastens the viewing screen holder to the rear of the camera against the gasket surface 52. By peering into the viewing screen, he adjusts the camera so that the screen is at the aperture focal length, and also selects a desired diaphragm opening and shutter speed. After everything is set, the viewing screen is replaced with a loaded film holder and an exposure is made.

Depending upon the results, the student can replace the lens with one having a different focal length, and/or can vary the diaphragm opening and shutter speed.

Advantages of the invention should now be apparent.

A principle advantage is that a camera of sufficient versatility to permit its use in scientific work can be constructed from component parts supplied in kit form. In particular, with respect to its use in scientific work, the camera permits viewing the exact image which will be recorded on film; and making observations on the position, size and sharpness of an image; and the amount of light coming through the lenses. The camera permits the use of different lens having different focal lengths; permits varying the amount of light, as well as varying exposure times; and is adapted for use with commercial cut film.

Further, the invention has the advantage that it teaches in detail the principles of camera construction, its use, and application of these principles to scientific work.

Above all, the camera can be constructed from inexpensive materials such as cardboard, strips of wood, rubber and metal parts.

Although the invention has been described with respect to specific embodiments, variations within the scope of the following claims will be apparent to those skilled in the art.

What is claimed is:

1. A camera comprising:
front and rear boxes telescopically movable one within the other to define an enclosure of variable length, both of said boxes being open at their facing ends and including a surface at their opposite ends, said surfaces being in a spaced-apart relationship;
the surface of said front box defining a first opening and the surface of said rear box defining a second enlarged rectangular opening;
frame means at said rear box surface adjacent said second opening for supporting a film holder across said second opening;
means extending across said first opening for defining an aperture;
a diaphragm in tab form having a plurality of aligned openings of different diameters;
a shutter also in tab form including an opening;
guide means for guiding said diaphragm and said shutter across said front box surface with the openings thereof alignable with said aperture, said guide means including a base layer disposed against said front box and having an opening therein aligned with the front box opening, a first pair of spaced-apart strips on said base member to define a diaphragm guide channel, a second pair of spaced-apart strips at right angles to said first spaced-apart strips but positioned on the exposed surface thereof to define a shutter guide channel, and a third pair of spaced-apart strips positioned over said second pair and overlapping onto the shutter guide channel to hold said shutter within said shutter guide channel, said third pair further defining a stop at the bottom of the shutter guide channels.

2. A camera comprising:
front and rear boxes telescopically movable one within the other to define an enclosure of variable length, both of said boxes being open at their facing ends and including a surface at their opposite ends, said surfaces being in a spaced-apart relationship;
the surface of said front box defining a first opening and the surface of said rear box defining a second enlarged rectangular opening;
frame means at said rear box surface adjacent said second opening for supporting a film holder across said second opening;
means extending across said first opening for defining an aperture;
a diaphragm in tab form having a plurality of aligned openings of different diameters;
a shutter also in tab form including an opening and actuatable by a rubber band affixed to said enclosure;
guide means for guiding said diaphragm and said shutter across said front box surface with the openings thereof alignable with said aperture; and,
a trigger member engageable with said shutter at separate spaced elevations, one elevation being that where the opening of the shutter is aligned with the enclosure aperture and the other elevation being that where the opening of the shutter is above the enclosure aperture, said shutter being adapted for movement from said second elevation across the enclosure aperture.

3. A camera comprising:
front and rear boxes telescopically movable one within the other to define an enclosure of variable length, both of said boxes being open at their facing ends and including a surface at their opposite ends, said surfaces being in a spaced-apart relationship;
the surface of said front box defining a first opening and the surface of said rear box defining a second enlarged rectangular opening;
frame means at said rear box surface adjacent said second opening for supporting a film holder across said second opening;
means extending across said first opening for defining an aperture;
a gasket surface extending about said second opening for providing a lighttight fit with a camera cut-film holder when said holder is supported by said frame means, said second opening being substantially the same size as commercial cut film; and,
a viewing screen holder positionable in said frame means defining an opening substantially the same size as said rear box opening, said holder including a viewing screen across said viewing screen opening, said viewing screen holder including a spacing portion adapted to position the viewing screen in a spaced relationship from said gasket surface at about the same distance cut film is positioned therefrom by said film holder.

4. The camera according to claim 3 wherein said viewing box comprises layers of cardboard between which the viewing screen is positioned.

5. A kit for constructing a camera, said kit comprising:
a flat sheet of construction material which includes thereon an outline of the major camera components;
first and second pieces removable from said sheet and shaped to be folded into front and rear boxes, each of said boxes being open at one end and having a surface at the other end, one of said boxes being telescopically slidable within the other of said boxes such that said end surfaces are in spaced relationship, said boxes together forming an enclosure of variable length;
the surface of said front box defining a first opening and the surface of the rear box defining a second enlarged rectangular opening;
a third piece removable from said sheet in tab form constituting a shutter and defining an opening;
a fourth piece removable from said sheet constituting a diaphragm and having therein a plurality of openings of different diameters;
means for defining an aperture across said first opening;
guide means fastenable to the end surface of said front box for guiding said third and fourth pieces in separate planes so that the openings therein are alignable with said aperture;
frame means for supporting a film holder at the end surface of said rear box; and,
at least one further piece foldable into a viewing box enclosure and including a portion removable therefrom to define a viewing screen opening, said viewing box enclosure being positionable in said frame means and interchangeable with said film holder.

6. The kit as defined in claim 5 wherein said guide means comprises a plurality of strips removable from said sheet for assembly onto said front box adjacent said first opening.

7. A kit for the construction of a camera, said kit comprising:

a flat die-cut sheet of cardboard which is perforated and creased;

a first piece removable from said sheet foldable to define a front box including sides, a front wall and an open end removed from the front wall;

a second piece removable from said sheet foldable to define a rear box including sides, a rear wall and an open end removed from the rear wall;

a portion removable from said first piece front wall to define a first opening;

a second portion removable from said second piece rear wall to define a second enlarged rectangular opening;

said front and rear boxes being telescopically movable one within the other with the front and rear walls in spaced relation to define the camera enclosure;

frame means positionable adjacent said rear wall rectangular opening to support a film holder;

means for defining an aperture across said first opening;

a first tab removable from said sheet constituting the camera shutter including a portion removable therefrom to define an opening;

a second tab removable from said sheet constituting the camera diaphragm including portions removable therefrom defining a plurality of aligned openings of different diameters;

a plurality of strips removable from said sheet for mounting adjacent said first opening to form guides for said diaphragm and said shutter for aligning the openings thereof with said aperture; and, at least one further piece removable from said sheet and foldable to define a viewing box enclosure including a portion removable therefrom to define a viewing screen opening, said viewing box enclosure being positionable in said frame means and interchangeable with said film holder.

* * * * *